Figure 1:
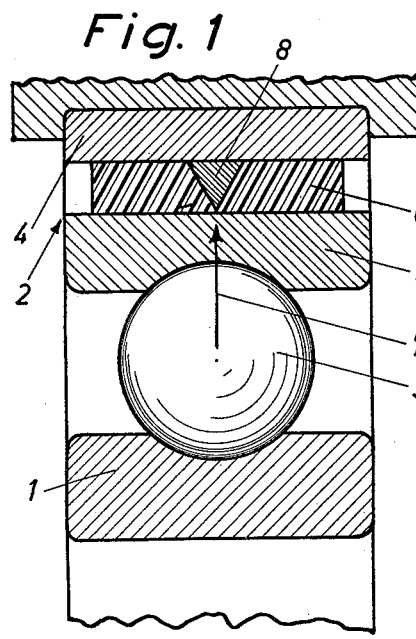

June 11, 1963 F. VASTA 3,093,427
BALL OR ROLLER BEARINGS
Filed May 11, 1959 2 Sheets-Sheet 1

INVENTOR
FRANCESCO VASTA
BY

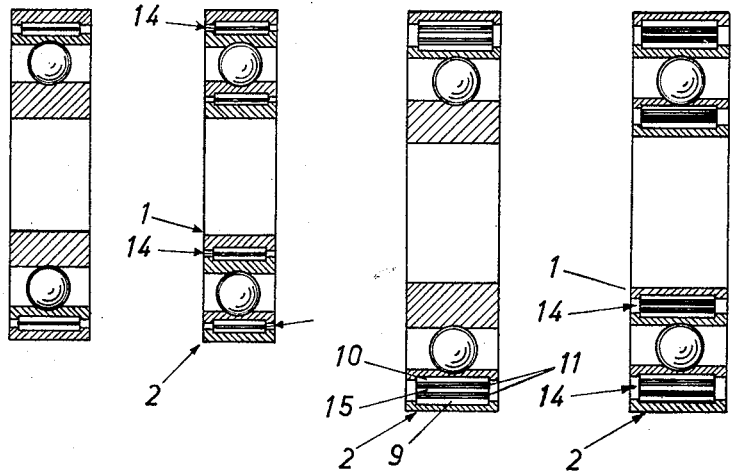
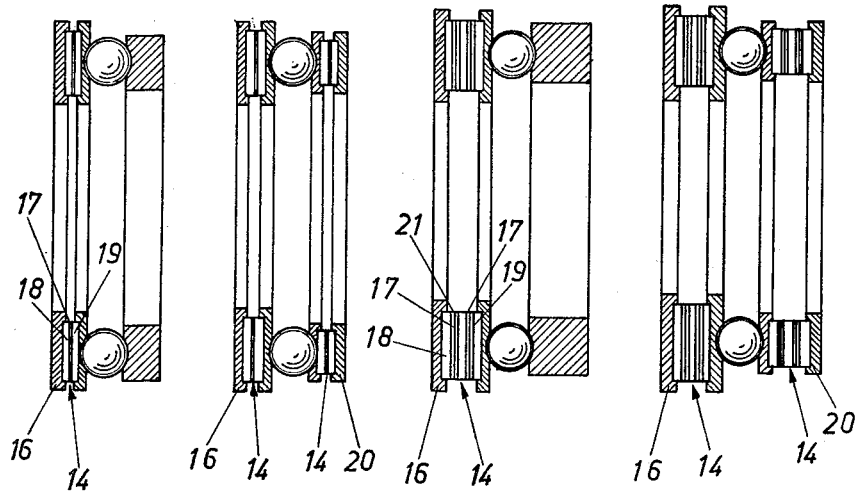

United States Patent Office 3,093,427
Patented June 11, 1963

3,093,427
BALL OR ROLLER BEARINGS
Francesco Vasta, Via del Gambero 8, Rome, Italy
Filed May 11, 1959, Ser. No. 812,240
6 Claims. (Cl. 308—184)

This invention relates to ball or roller bearings having running rings of which at least one is provided with damping elements arranged coaxially with the row of the rolling means of the bearing, said damping elements comprising a material more elastic than the material of the rings.

It is previously known to provide the outer running ring of, for instance, a ball bearing with a damping element in the form of a ring of elastic material, e.g. rubber. In the damping element, if only of elastic material e.g. rubber, and homogeneous, the central portion is exposed to greater stresses than the other parts and this central portion has a tendency to be fatigued after the bearing has been used for some time. The present invention refers to other new systems of damping elements.

According to the invention, the damping elements are arranged on the two broad sides of a supporting ring of a metallic material having an oblong cross section. Due to the fact that the damping elements are arranged on both sides of a supporting ring (of steel or metal), the pressure stresses are distributed over practically the whole cross section of the damping elements.

Figure 4:
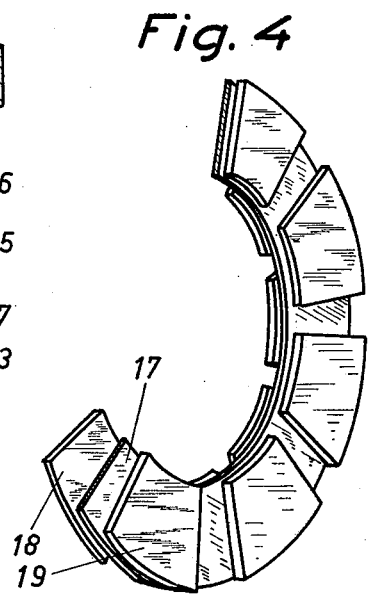
Figure 2:
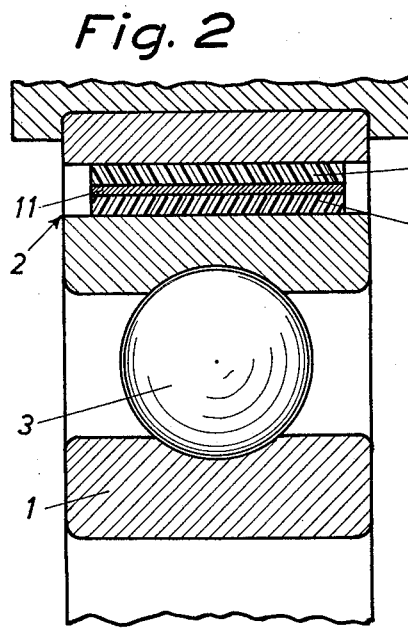
Figure 3:
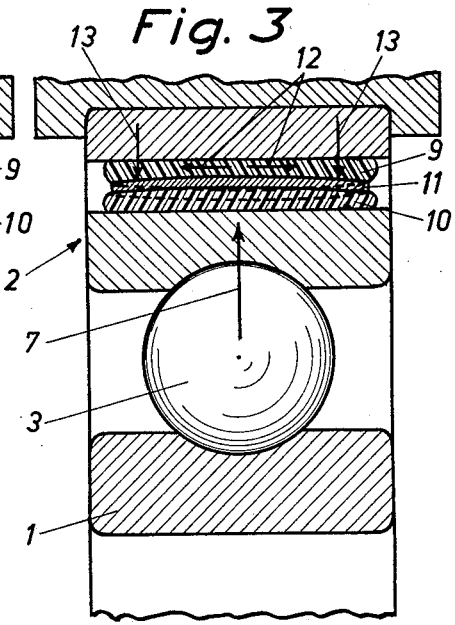

In the following, the invention will be elucidated with reference to the accompanying drawings. In the drawings:

FIG. 1 shows a section through a ball bearing having a damping element of known type arranged in its outer running ring, FIG. 2 shows a similar section through a ball bearing with the damping element arranged in accordance with the invention, FIG. 3 shows the same device under load, FIG. 4 shows diagrammatically a supporting ring with damping elements according to the invention and provided for a thrust bearing, and FIGS. 5–12 show sections through different types of ball bearings provided with a damper device according to the invention.

In FIGS. 1–3, the inner running ring of the ball bearing has been designated with 1 and the outer running ring of the same with 2. The ball shaped running elements of the bearing are designated with 3. The outer running ring comprises two rings 4, 5 and an interposed damping device.

According to FIG. 1, the damping device comprises a ring 6 of elastic material, e.g. rubber. When the damping device is exposed to an internal pressure, indicated by the arrow 7, the central portion 8 of the damping ring (indicated by a triangle, sectioned in a special way but it may instead have another shape, e.g. an oblong ellipse) is exposed to considerably greater stresses than the material on both sides of said portion. The central portion 8 will thus be more compressed than the other material of the ring 6.

In FIGS. 2 and 3, the damping device comprises damping elements 9 and 10 arranged on both sides of a supporting ring of steel or metal. The supporting ring 11 has an oblong cross section and the damping elements 9 and 10 are arranged on both broad surfaces of the supporting ring. Due to the supporting ring 11, the pressure stresses (see the arrow in FIG. 3) are distributed on practically the whole cross section of the damping elements 9, 10. When the damping device is exposed to the internal pressure, indicated by the arrow 7, the supporting ring 11 is bent with its central portion slightly outwards. The elastic material is thereby pressed to the side in the direction of the arrows 12. The elastic material of the border portions is thereby compressed and bows the border portions of the supporting ring towards the center of the bearing in the direction of the arrows 13. This causes the damping elements to participate with practically their whole surface in the work of equalizing and absorbing the vibrations of the bearing. Due to the fact that the damping elements 9 and 10 take up the stresses on almost their whole surface—and not as in previous known devices with only their central portion—the damping device is given a longer life. Also the damping effect will be considerably increased.

In FIG. 5 there is shown on a reduced scale the same ball bearing as in FIGS. 2 and 3.

The ball bearing according to FIG. 6 is provided with a damping device 14 in the outer running ring 2 of the ball bearing as well as in the inner ring 1 of the same.

In FIG. 7 there is shown a ball bearing with a special damping device in the outer running ring 2. This damping device comprises two supporting rings 11 having on their radially outer as well as their radially inner broad surfaces damping elements 9, 10, and 15.

According to FIG. 8, the ball bearing has been provided with a damping device 14 corresponding to the one shown in FIG. 7 in the outer running ring 2 as well as in the inner running ring 1.

In FIG. 9 there is shown a thrust bearing with one of its running rings provided with a damping device of principally the same construction as the one shown in FIGS. 2 and 3. The supporting ring 17 is, however, according to FIG. 9 shaped as a disk. The damping elements 18, 19 are arranged on both sides of the supporting ring 17.

In FIG. 10 there is shown a similar thrust bearing having a damping device 14 arranged in both of the running rings 16, 20.

In FIG. 11 there is shown a thrust ball bearing with a damping device 14 in one of the running rings 16, said damping device comprising two supporting rings having on either side damping elements 18, 19, and 21.

The thrust bearings according to FIG. 12 are provided with two running rings 16 and 20 each having a damping device 14 according to FIG. 11.

The damping devices of the thrust bearing according to the invention may comprise three or more different damping elements having different moduli of elasticity.

Also the damping elements according to FIGS. 7 and 8 may have different moduli of elasticity.

As obvious from FIG. 4, the damping elements on both sides of the supporting ring 17 need not extend interruptively over the whole length of the supporting ring 17. According to a preferred embodiment, they instead comprise pieces of an elastic material in the form of sectors arranged at some distance from each other on both sides of the supporting ring. As there is a space between the elastic pieces, the material of the latter has a possibility to spring outwardly in this space. Thereby is obtained an increased springing effect and thus also the vibration damping effect.

This effect will be further increased if the pieces of elastic material in one row are situated opposite the spaces between the pieces of elastic material in the row at the other side of the supporting ring of the damping device.

Besides the ball bearings mentioned here above, other rolling bearings could be manufactured with one, two or more of the vibration damping devices set forth here above. The invention could also be used in ball bearings having several rows of balls, at spherical ball or roller bearings, at bearings having conical or cylindrical rollers or rollers having a curved profile, double thrust bearings or other kinds of special bearings. The invention may generally be used at almost any kind of ball or roller bearings.

What I claim is:

1. An anti-friction bearing having two race rings, at least one race ring comprising an inner ring portion, an outer ring portion, two annular damping elements located between the inner and outer ring portions of each race ring, said damping elements being of a material which is more elastic than the material of said inner and outer ring portions, and a flat metal supporting ring disposed between the damping elements extending between the damping elements for substantially the width of the damping elements.

2. An anti-friction bearing having two race rings, at least one race ring comprising an inner ring portion, an outer ring portion disposed concentrically about said inner ring portion, two annular concentric damping elements located between the inner and outer ring portions of each race ring, said damping elements being made of a material which is more elastic than the material of said inner and outer race ring portions, and a flat metal supporting ring disposed between the damping elements extending between the damping elements for substantially the width of the damping elements.

3. The combination according to claim 2 wherein both race rings each comprise inner and outer ring portions, damping elements, and a support ring.

4. An anti-friction thrust bearing having two race rings, at least one ring comprising, in combination, an inner ring portion, an outer ring portion disposed parallel to and beyond said inner ring portion, two flat parallel damping elements of a material which is more elastic than the material of said ring portions disposed between said ring portions, and a flat metal supporting ring disposed between said damping elements and extending between the damping elements for substantially the width of the damping elements.

5. The combination according to claim 4 wherein said damping elements each comprise sets of sector shaped pieces spaced apart, the sector shaped pieces of the sets on both sides of said supporting ring extending past the spaces between the sector shaped pieces on the other side of said supporting ring.

6. An anti-friction bearing having two race rings, at least one ring comprising an inner ring portion, an outer ring portion, two sets of flat damping elements located between the inner and outer ring portions of each race ring, said damping elements being spaced apart from each other said damping elements being of a material which is more elastic than the material of said inner and outer ring portions, and a flat metal supporting ring disposed between the sets of damping elements extending between the damping elements for the width of the damping elements.

References Cited in the file of this patent

UNITED STATES PATENTS

| | | |
|---|---|---|
| 1,579,798 | Vail | Apr. 6, 1926 |
| 2,211,295 | Searles | Aug. 13, 1940 |
| 2,733,108 | Cowles | Jan. 31, 1956 |
| 2,760,359 | Wildhaber | Aug. 28, 1956 |
| 2,839,340 | Merchant | June 17, 1958 |
| 2,927,825 | Stone | Mar. 8, 1960 |

FOREIGN PATENTS

| | | |
|---|---|---|
| 553,760 | Great Britain | June 3, 1943 |
| 865,559 | Germany | Feb. 2, 1953 |
| 922,094 | Germany | Jan. 7, 1955 |
| 1,101,288 | France | Apr. 20, 1955 |